United States Patent Office 3,014,781
Patented Dec. 26, 1961

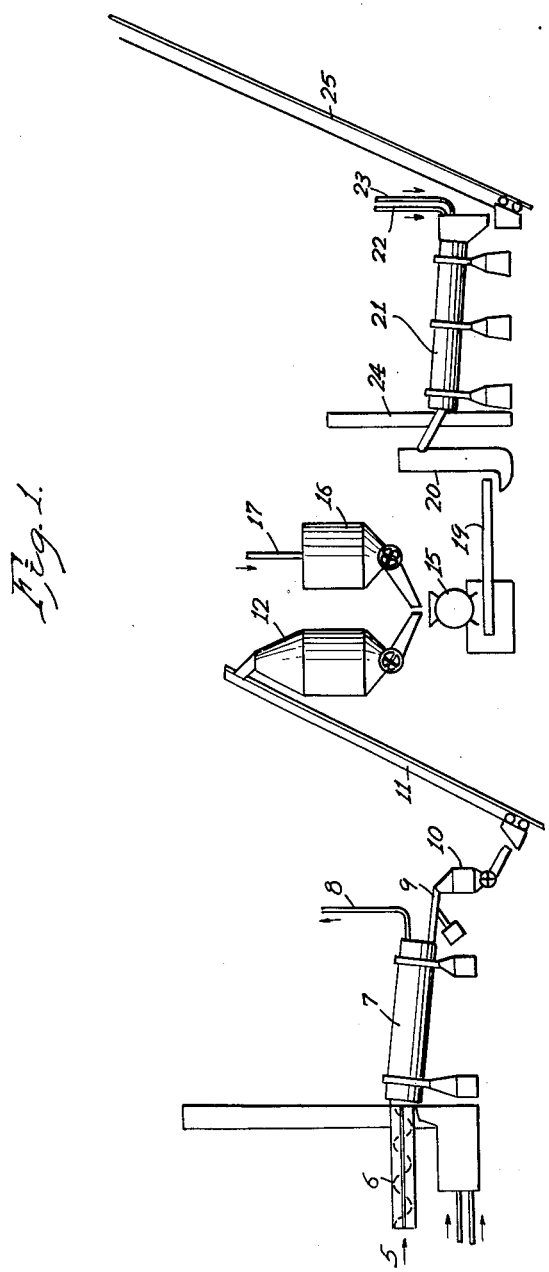

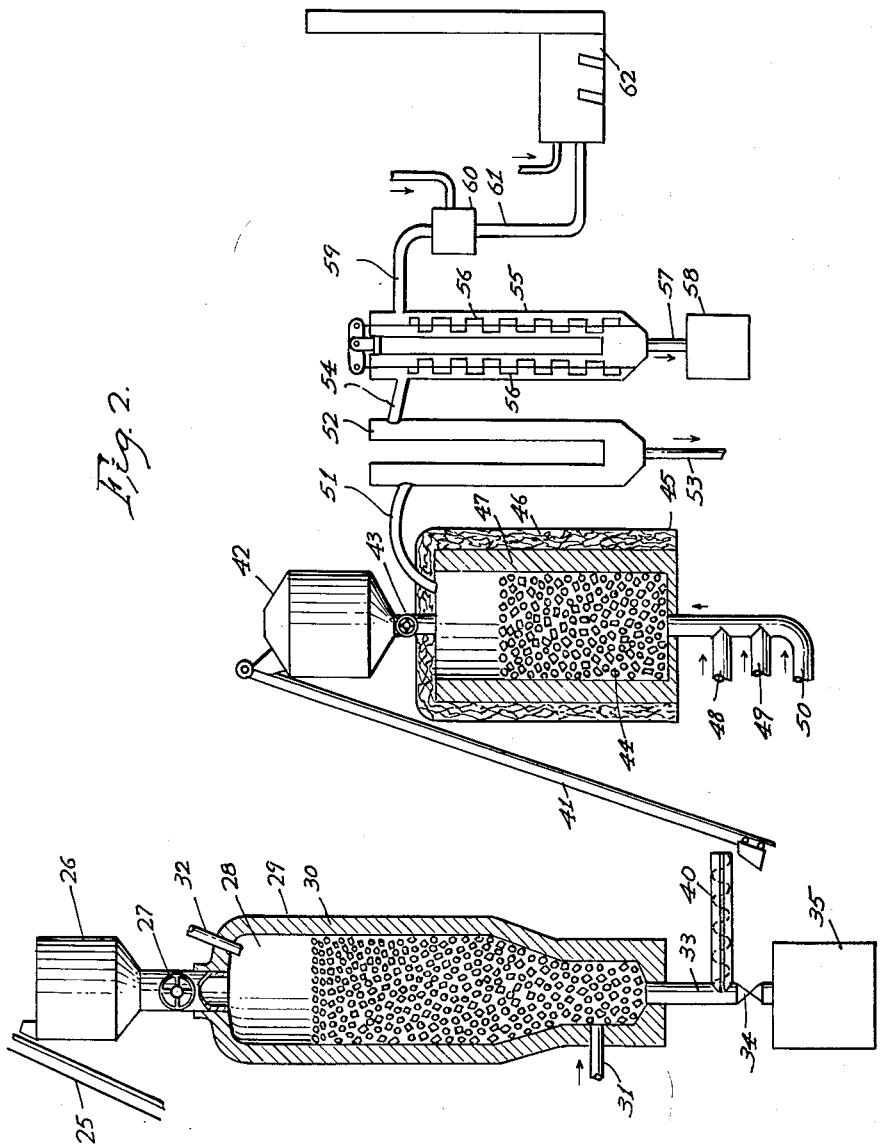

3,014,781
REFINING AN ALUMINUM-PHOSPHOROUS
CONTAINING MATERIAL
Oran L. Culberson, Indiana Township, Allegheny County, and William A. Pardee, Fox Chapel, Pa., assignors to Gulf Research & Development Company, Pittsburgh, Pa., a corporation of Delaware
Filed Mar. 20, 1953, Ser. No. 343,562
5 Claims. (Cl. 23—96)

This invention relates to a process of refining an aluminum-phosphorus containing material and more particularly to the recovery of valuable aluminum and phosphorus components from aluminum-phosphorus compounds and complexes.

Alumina is used extensively in the chemical industry in the manufacture of various chemicals such as aluminum sulfate and aluminum chloride. It is further used in the production of aluminum in an electrolytic furnace. The latter use requires alumina which is extremely pure.

Pure alumina can be obtained from bauxite by various processes one of which is that known as the Bayer process. This process comprises calcination of the bauxite in order to destroy organic matter and to oxidize the iron which is present in bauxite. Calcination of the bauxite is followed by digesion with an aqueous solution of caustic soda. The alumina is thus dissolved in the caustic soda solution. The liquor from the digester is diluted with water and then filtered whereby the iron is removed. The filtrate containing sodium aluminate is then agitated in the presence of previously prepared alumina which aids in the precipitation of the dissolved alumina. The alumina is separated from the solution by filtration and then dried and calcined. The alumina thus obtained is of a grade suitable for use in the production of aluminum in an electrolytic furnace. While this process produces relatively pure alumina, the process has certain disadvantages.

The present invention relates to a simplified process of recovering pure alumina from aluminum-phosphorus containing materials which are substantially free of calcium and silicon components and is particularly applicable to the recovery of alumina from an organo-aluminum-phosphorus complex.

Organo-aluminum-phosphorus complexes are obtained as a residual material upon hydrolysis of an alkyl chloride-aluminum chloride-phosphorus chloride complex. This residual material comprises essentially a mixture of aluminum chloride hydrates, alkyl dichloro phosphine oxides, organo-aluminum chloride-phosphorus chloride complexes, some aluminum and phosphorus complexes in unknown combined forms, alkyl chlorides, hydrogen chloride, and hydrochloric acid. The nature of the residual material is such that it presents a disposal problem. While the residual material can be rendered substantially innocuous so that it can be dumped or used as fill, such use is undesirable in that it is wasteful of aluminum as well as phosphorus.

According to the process of our invention the residual material obtained during the hydrolysis of an alkyl chloride-aluminum chloride-phosphorus chloride complex can be converted into useful products. The products comprise substantially pure alumina and phosphorus. The alumina serves as a useful starting material in the formation of numerous compounds of aluminum as well as in the production of aluminum metal. The phosphorus is advantageously utilized in the production of phosphoric acid.

The process of our invention comprises calcining an aluminum-phosphorus containing material at a temperature of about 1600° to about 1800° F., treating the calcined product under reducing conditions until the phosphorus component of the calcined product has been substantially removed in the form of elemental phosphorus, and recovering substantially pure alumina from the calcined product which has been subjected to reduction. The aluminum-phosphorus containing material which is subjected to calcination is preferably one free of calcium and silicon components and one which has been dried at a temperature of about 500° to about 1000° F. whereby the more volatile constituents are removed.

When the aluminum-phosphorus containing material is the residual material obtained upon hydrolysis of an alkyl chloride-aluminum chloride-phosphorus chloride complex, the process of our invention comprises heating said residual material at a temperature of about 500° to about 1000° F. until substantially all of the material volatile within this temperature range has been removed, calcining the resulting dried product at a temperature of about 1600° to about 1800° F., contacting the calcined product under reducing conditions until the phosphorus component of the calcined product has been reduced to elemental phosphorus, and recovering substantially pure alumina from the calcined product which has been subjected to reduction.

While the process of the invention lends itself to the recovery of aluminum and phosphorus components from numerous aluminum-phosphorus containing materials, the invention will hereinafter be described in connection with a residual material obtained in the preparation of an alkyl phosphonyl dichloride.

In the preparation of methyl phosphonyl dichloride, a complex between methyl chloride, phosphorus trichloride and aluminum chloride is hydrolyzed at a temperature between about 0° and 40° C. Upon standing at a temperature between about 0° and 5° C., a crystalline product separates from the hydrolysis reaction mass. The crystalline product is separated from the reaction mass by extraction with methylene chloride. Methyl phosphonyl dichloride is recovered from the methylene chloride solution by distilling off the methylene chloride. A similar procedure is employed in the production of isopropyl phosphonyl dichloride and tertiary butyl phosphonyl dichloride. The residual material remaining after extraction of the alkyl phosphonyl chloride is the material with which the process of this invention is applicable. The residual material contains essentially all of the aluminum and about 25 to 30 percent of the phosphorus introduced in the charge complex. Depending upon the completeness of the removal of the extractant, the residual material may comprise about 20 to 30 percent by weight of solvent, such as, for example, methylene chloride. The methylene chloride, water and other volatiles such as hydrogen chloride are first removed by heating the residual material to about 500° to about 1000° F. The methylene chloride and hydrogen chloride are advantageously recovered for further use. The residual material having been freed of the more volatile constituents is then heated to a calcining temperature of about 1600° to about 1800° F. The calcined product comprises about 10 to 20 percent of the original residual material and contains about 40 percent aluminum, about 10 percent phosphorus and about 50 percent oxygen.

The calcined product is then treated under reducing conditions whereby the phosphorus component of the calcined residual material is reduced to elemental phosphorus and removed as an overhead product. The reduction is advantageously carried out in the presence of coke in a modified blast furnace operation at a temperature of about 1600° to about 2300° F. The air in the blast furnace operation as applied to this invention furnishes the oxygen necessary to burn the coke which, in turn, supplies the heat required for the reduction. The amount of air should be carefully controlled so that there is substantially no oxygen present at the time that the phosphorus is formed. If an excess of oxygen is present when the phosphorus is formed, there is a strong tendency for the phosphorus to be converted into an oxide. By controlling the amount of air so that only enough oxygen is supplied to burn the coke, the oxidation of phosphorus is minimized. The inert gas comprising nitrogen which remains after the oxygen is removed from the air serves as a useful expellent in removing the phosphorus from the blast furnace.

The coke employed in the reduction step in the blast furnace, upon being burned, not only supplies the heat required to carry out the reduction but also furnishes the carbon required for promoting the reduction reaction. This coke may be added either prior or subsequent to the calcining step. The amount of coke added may be just sufficient to carry out the reduction reaction. However, when the alumina obtained from the reduction step is to be used in the production of aluminum chloride, it is desirable to add a sufficient amount of coke prior to the reduction step to supply the heat and carbon required for carrying out the subsequent chlorination. Chlorination is carried out at a temperature of about 1600° to about 2000° F. Therefore, the alumina produced in accordance with this invention is advantageously removed from the phosphorus reduction step at the temperature required to carry out chlorination. Chlorination of the alumina may be carried out with any of the conventional chlorinating agents such as hydrogen chloride, a mixture of chlorine and oxygen, a mixture of chlorine and carbon monoxide, or phosgene. It is understood of course that when a mixture of chlorine and oxygen is the chlorinating agent, it is also important that a reducing amount of carbon should be present. When a mixture of chlorine and oxygen is used as the chlorinating agent, it is preferred to employ about three volumes of chlorine to one volume of oxygen. The amount of coke necessary to carry out the chlorination can not definitely be stated. In general, it is not desirable to use less than one part by weight of coke to five parts by weight of alumina. Equal parts by weight of coke and alumina are preferred.

The coke employed in the process of the invention is advantageously wood charcoal. Wood charcoal is preferred because the reduction reaction can be carried out at a temperature approximately 300° F. below the temperature required for carrying out the reduction in the presence of petroleum coke. It is advantageous to carry out the reduction step at as low a temperature as possible when the alumina is to be used in the production of aluminum chloride because high temperatures favor the formation of alumina which is less reactive. Naturally, the ultimate use of the alumina will dictate to some extent at least, the type of coke employed. If the less reactive alumina is desired, petroleum coke can be used.

In order that the invention may be understood more fully, reference should be had to the attached figures which illustrate diagrammatically a preferred embodiment of the invention.

FIGURE 1 illustrates the drying and calcining steps of the process. FIGURE 2 illustrates the reduction and chlorination steps of the process.

The process will be described in connection with a residual material obtained from the manufacture of methyl phosphonyl dichloride. It should be understood, of course, that the process is applicable to other aluminum-phosphorus containing materials as well as other residual materials of this type whether the organo-phosphonyl dichloride from which the residual material is obtained is the methyl, ethyl, propyl, isopropyl, butyl, isobutyl, secondary butyl, tertiary butyl or other organo-phosphonyl dichloride.

The treatment of the aluminum-phosphorus containing material prior to the phosphorus reduction step will vary depending upon the particular charge stock used. It is desirable, however, to remove the constituents which can be volatilized at temperatures between about 500° and about 1000° F. and then subject the thus dried product to a calcining temperature of about 1600° to about 1800° F.

As illustrative of a preferred embodiment of the invention, a residual material comprising essentially a mixture of aluminum chloride hexahydrate, organo-aluminum chloride-phosphorus chloride complexes, methylene chloride, hydrogen chloride, and water obtained from the hydrolysis of a methyl chloride-aluminum chloride-phosphorus chloride complex in a system not shown is introduced at 5 (see FIGURE 1) by a conveyor 6 into a drier 7. The methylene chloride comprises about 20 to 30 percent by weight of the residual material introduced at 5. This methylene chloride in the residual material results in part from its being used as a solvent to remove methyl phosphonyl dichloride from the reaction mass obtained upon hydrolysis of the methyl chloride-aluminum chloride-phosphorus chloride complex. The nature of the residual material introduced into drier 7 is such that conveyor 6 is advantageously of the ribbon type. The volatile material removed in drier 7 is advantageously recovered; therefore drier 7 is advantageously an indirect heated rotary drier constructed of corrosion-resistant material such as nickel-clad steel. The residual material in drier 7 is heated to a temperature of about 500° to about 1000° F. The volatile material consisting essentially of methylene chloride, hydrogen chloride, and water is removed to a recovery system (not shown) by conduit 8. The dried residual material is removed from drier 7 by a vibrating conveyor 9 and collected in a hopper 10. From hopper 10 the dried residual material is conveyed by a skip hoist 11 to a storage hopper 12. From storage hopper 12 the dried residual material is fed to a hammer mill 15 where it is admixed and ground with coke which has been introduced into the hammer mill 15 from a hopper 16. Coke is introduced into hopper 16 by conduit 17. The material from hammer mill 15 is advantageously of such size that it will pass through a half inch screen but will be retained on an eighth inch screen. From hammer mill 15 the mixture of dried residual material and coke is fed by a belt conveyor 19 to a bucket elevator 20 which discharges the dried material into a rotary kiln 21. Rotary kiln 21 is fired by natural gas and air introduced into the kiln by conduits 22 and 23, respectively. In rotary kiln 21 the residual material is heated to a calcining temperature of about 1600° to about 1800° F. Waste gases are removed through stack 24. A calcined product is removed from kiln 21 to a skip hoist 25 which conveys the calcined product to a feed hopper 26 shown in FIGURE 2. From feed hopper 26 calcined product is passed by a feeding means 27 into the top of a blast furnace 28. Blast furnace 28 comprises an outer iron shell 29 which is lined with fire brick 30. As the calcined product descends through blast furnace 28 it comes in contact with a stream of blast air introduced by conduit 31. The blast air may be introduced at room temperature or it may be introduced at a temperature up to about 1000° F. When alumina is to be recovered as such and not subsequently converted into aluminum chloride, the blast air is advantageously preheated in order to completely burn out the coke and thus leave alumina which is substantially free from coke.

A stream comprising phosphorus and flue gas is removed from the top of blast furnace 28 by conduit 32. When the system is correctly operated this stream is substantially free from oxygen. This stream may be further processed to recover the phosphorus as phosphoric acid. Recovery of the phosphorus as phosphoric acid can be accomplished in a conventional system (not shown).

From the bottom of blast furnace 28 alumina is withdrawn through conduit 33 and passed through valve 34 to storage tank 35.

When it is desired to employ the alumina in the manufacture of aluminum chloride, valve 34 is closed and the alumina is transferred from conduit 33 by a screw conveyor 40 to a skip hoist 41 which conveys the alumina to a feed hopper 42. When the alumina is to be used in the production of aluminum chloride, an excess of coke is employed in the phosphorus reduction step so that there will be sufficient coke to carry out the chlorination. From feed hopper 42 the alumina is passed by a feeding means 43 into retort 44. Retort 44 comprises an outer steel shell 45, insulating material 46, such as bauxite, kieselguhr and the like, and fire brick 47. In retort 44 the calcined product is chlorinated by the introduction of chlorine, oxygen, and compressed air by conduits 48, 49, and 50, respectively. Chlorination in retort 44 is advantageously carried out at a temperature of about 1600° to about 2000° F. Operation of the retort consists in passing a continuous stream of about 75 percent by volume chlorine and 25 percent by volume oxygen at a pressure of about 5 pounds per square inch gauge through the mixture of alumina and coke. When chlorine appears in the retort effluent, an additional quantity of alumina and coke is introduced from feed hopper 42 into retort 44. It will be understood that the addition of coke and alumina can be continuous or batchwise as desired. Air is introduced periodically along with the chlorine and oxygen in order to minimize hot spot formation in the retort. Effluent from retort 44 at about 1600° to about 2000° F. is introduced by a conduit 51 into a U-shaped brick-lined atmospheric cooler 52. In cooler 52 the gas temperature is reduced to about 500° F. and any coke or unreacted calcined product entrained in the gases drops out and can be removed by conduit 53. The gases leaving cooler 52 are passed by a conduit 54 to a U-shaped condenser 55. U-shaped condenser 55 consists of two steel tubes having jackets through which cooling water flows. On the inside of each tube is a scraper 56 which removes the aluminum chloride from the sides of the tubes. The aluminum chloride is then removed through conduit 57 to storage tank 58. Uncondensed gases at a temperature of about 110° F. which leave condenser 55 by conduit 59 are scrubbed with water in scrubber 60 and then passed by conduit 61 to furnace 62 where the gases are burned.

While the invention has been described herein with particular reference to certain specific embodiments thereof by way of illustration, it is to be understood that the invention is not limited to such embodiments except as hereinafter defined in the appended claims.

We claim:
1. A process for producing alumina from a residual material obtained upon hydrolysis of an alkyl chloride-aluminum chloride-phosphorus chloride complex which comprises heating said residual material at a temperature of about 500° to about 1000° F. to remove the more volatile constituents, calcining the resulting dried product at a temperature of about 1600° to about 1800° F., treating the calcined product with a blast of air in the presence of coke at a temperature of about 1600° to about 2300° F. until the phosphorus component of the calcined product has been substantially removed in the form of elemental phosphorus, and recovering substantially pure alumina from the calcined product which has been subjected to reduction.

2. A process for producing aluminum chloride from a residual material obtained upon hydrolysis of an alkyl chloride-aluminum chloride-phosphorus chloride complex which comprises heating said residual material at a temperature of about 500° to about 1000° F. to remove the more volatile constituents, calcining the resulting dried product at a temperature of about 1600° to about 1800° F., treating the calcined product with a blast of air in the presence of coke at a temperature of about 1600° to about 2300° F. until the phosphorus component of the calcined product has been substantially removed in the form of elemental phosphorus, recovering susbstantially pure alumina from the calcined product which has been subjected to reduction, contacting said alumina with a chlorinating agent under reducing conditions at a temperature of about 1600° to about 2000° F. until the aluminum component of said alumina has been converted into aluminum chloride, and condensing and recovering aluminum chloride from the vaporous chlorinated product.

3. A process for producing aluminum chloride from a residual material obtained upon hydrolysis of an alkyl chloride-aluminum chloride-phosphorus chloride complex which comprises heating said residual material at a temperature of about 500° to about 1000° F. to remove the more volatile constituents, calcining the resulting dried product at a temperature of about 1600° to about 1800° F., treating the calcined product with a blast of air in the presence of coke at a temperature of about 1600° to about 2300° F. until the phosphorus component of the calcined product has been substantially removed in the form of elemental phosphorus, recovering substantially pure alumina from the calcined product which has been subjected to reduction, contacting said alumina with a chlorinating agent comprising a mixture of chlorine and oxygen in the presence of coke at a temperature of about 1600° to about 2000° F. until the aluminum component of said alumina has been converted into aluminum chloride, and condensing and recovering aluminum chloride from the vaporous chlorinated product.

4. A process for producing aluminum chloride from a residual material obtained upon hydrolysis of an alkyl chloride-aluminum chloride-phosphorus chloride complex which comprises heating said residual material at a temperature of about 500° to about 1000° F. to remove the more volatile constituents, admixing the resulting dried product with about an equal weight of coke, calcining the resulting mixture of coke and dried product at a temperature of about 1600° to about 1800° F., treating the calcined mixture of coke and dried product with a blast of air at a temperature of about 1600° to about 2300° F. until the phosphorus component of the calcined mixture has been substantially removed, contacting the resulting calcined mixture from which the phosphorus has been removed with a chlorinating agent at a temperature of about 1600° to about 2000° F., and recovering aluminum chloride from the vaporous chlorinated product.

5. The process of claim 4 wherein the chlorinating agent is a mixture of chlorine and oxygen.

References Cited in the file of this patent
UNITED STATES PATENTS

| | | |
|---|---|---|
| 1,814,397 | McAfee | July 14, 1931 |
| 1,867,241 | Weigel | July 12, 1932 |

FOREIGN PATENTS

| | | |
|---|---|---|
| 18,785 | Great Britain | of 1895 |